United States Patent [19]
Matyas

[11] 3,758,698
[45] Sept. 11, 1973

[54] FRETTED INSTRUMENT FINGERBOARD CHORD SLIDE RULE

[76] Inventor: Joseph F. Matyas, 218 2nd St., Hicksville, Long Island, N.Y. 11801

[22] Filed: Oct. 12, 1972

[21] Appl. No.: 296,857

[52] U.S. Cl. .................................................. 84/485
[51] Int. Cl. .......................................... G10b 15/00
[58] Field of Search ...................... 84/471, 477, 485

[56] References Cited
UNITED STATES PATENTS

| | | | |
|---|---|---|---|
| 1,821,516 | 9/1931 | Hohn | 84/485 |
| 2,001,191 | 5/1935 | Golden | 84/485 |
| 2,814,231 | 11/1957 | Jones | 84/485 |
| 3,554,074 | 1/1971 | Rickey | 84/485 |
| 3,668,967 | 6/1972 | Malis | 84/485 X |

Primary Examiner—Richard B. Wilkinson
Assistant Examiner—Lawrence R. Franklin
Attorney—Leonard H. King

[57] ABSTRACT

A 248/229 slide rule that simulates the finger board of fretted instruments is provided. The slide rule includes a housing having a plurality of longitudinally extending channels or guideways each of which is adapted to receiving an axially displaceable slide, one for each string of the instrument. A mask is provided having a number of openings arranged in a grid-like pattern that overlays the channels and the slides and which coincides with the strings and the frets of the instrument. One surface of each of the slides includes a reference mark that is visible as a distinctively colored dot through a selected one of the openings in the mask while the opposite or rear surface of each slide includes a sequential array of musical notes of the chromatic scale of the respective strings. The written note symbols on the rear surface of each slide successively register through openings in the rear surface of the housing in order to identify by letter the designation of the corresponding musical note indicated by the reference mark.

The aforementioned abstract is neither intended to define the invention of the application which, of course, is measured by the claims, nor is it intended to be limiting as to the scope of the invention in any way.

10 Claims, 10 Drawing Figures

Patented Sept. 11, 1973

3,758,698 ial to fretted musical instruments and more particularly to a device for converting musical notations to fingering positions and vice versa for a fretted musical instrument such as a guitar, banjo, ukulele, or the like.

FRETTED INSTRUMENT FINGERBOARD CHORD SLIDE RULE

BACKGROUND OF THE INVENTION

1. Field of the Invention

This invention relates generally to fretted musical instruments and more particularly to a device for converting musical notations to fingering positions and vice versa for a fretted musical instrument such as a guitar, banjo, ukulele, or the like.

There is a large family of musical instruments that utilize an elongated finger board over which a plurality of strings are stretched taut. Some examples of such instruments to which the present invention is applicable are guitars, ukuleles, mandalins, banjos etc.. Some ancient instruments that may be used with the instant invention of a tenor vielle, the treble viol, the viola gamba, the lute, the cittern, the laute etc.. The present invention may also be used with Far Eastern instruments such as the Japanese biwa, the Chinese lute, the Chinese flat lute Yueh, the South Indian nina, the North Indian nina, the South Indian stick, the Arabian mandola etc.. All of the foregoing instruments have in common a plurality of differently tuned strings that are stretched taut over a finger board and a plurality of frets which, in pairs, define different fingering positions.

2. Description of the Prior Art

Many devices are presently available for assisting the player of a fretted instrument to learn the relationship of musical notation, particularly chords, to the finger board of the instrument. However, there are no prior art devices that I am aware of that convert a musical chord directly into a visual fingering pattern that may be directly related to the frets of the instrument. Nor am I aware of any prior art device that can accomplish the reverse function as well. That is, the conversion of a fingering pattern on a fretted instrument into a musical chord.

The prior art devices that I am aware of may generally be characterized as "slide rule" types comprises of relatively movable members wherein entire chords are simultaneously displayed. Overlays or windowed cards are used whereby the composition of entire chords are made visible. For example, in U.S. Pat. No. 3,338,126, granted on Aug. 29, 1967 to N. C. Wiley, Jr. et al, a slide panel is moved relative to a body member so that a plurality of chord diagrams are visible through windows. Movement of the slide member produces pictorial examples of complete chords. Similarly, in U.S. Pat. No. 3,245,303, issued on Apr. 12, 1966 to R. O. Patt, a plurality of complete finger patterns for the playing of chords are provided by means of a grid-like overlay on a transparent sheet that is superimposed on a pattern corresponding to the fingering positions for different chords.

U.S. Pat. No. 2,832,252, granted on Apr. 29, 1958 to J. P. Gabriel, describes a slide rule type device that displays the names of notes in any given chord but does not relate the chord components to fingering positions. In U.S. Pat. No. 2,814,231, issued on Nov. 26, 1957, in the name of V. L. Jones, slide means are provided for displaying the names of the chords and the number of the fret to be used. The actual fingering for the entire chord is permanently marked on the slides.

SUMMARY OF THE INVENTION

By way of contrast the present invention is a hand held device that authentically simulates the finger board of a fretted instrument. A generally hollow housing is provided with internal dividers or walls that define a plurality of longitudinally extending channels. A cover plate in the form of a mask is positioned over the channels in the housing and is provided with a plurality of openings therethrough that are arranged in longitudinal columns and transverse rows corresponding, respectively, with the strings and the frets of the instrument. The column of openings are aligned over the channels in the housing.

An axially movable, elongated slide member is positioned in each of the channels. One surface of each slide member is provided with a distinctively colored reference mark that is visible through selected openings in the cover plate as the slides are moved longitudinally. The other surface of each slide member is marked sequentially with the chromatic notes of the scale corresponding to the string that is related to the particular channel. For example, one form of guitar has six strings which are named E, B, G, D, A, and E. Therefore, the reverse side of the slides for this fretted instrument will have the same sequential, chromatic notes and are placed in the channels in the same order as the strings of the instrument. This arrangement applies to all of the stringed instruments mentioned hereinabove. It will be understood however that the device may, within the scope of this invention, be made with more or less channels and a like number of slides. Of course, in any event, less than the full number of slides provided may be used if a less complete chord is desired. The rear surface of the housing of this invention includes a single transverse row of openings for displaying the chord element name that is visible through the corresponding cover plate opening of the front surface.

It is well known that key board chords, such as written for piano's etc., of the treble bass clefs can be converted into playable, finger board patterns. However, the key board chords are not always playable by the finger board instrument. Therefore the chords must be restructured to suit the particular instrument. This may be done with the present invention by simply identifying the individual notes of the chord, inserting the slides to match the instruments strings and the proceeding in the usual way to form the finger pattern. The present invention is readably useable by left handed players to solve their particular left handed playing problems and in this context it may be said that the present invention is "ambidextrous".

As will be appreciated more fully hereinafter the present invention is of great assistance to students of fretted instruments, whether they be beginers or advanced students. Over 4,500 chords may be constructed using the present invention in conjunction with a finger board of 18 frets for both the right hand player and the left hand player. The number of possible chord constructions for other fretted instruments varies depending upon the number of frets. For example, with nine frets there are a possibility of 2,250 chord variations that may be constructed with the present invention. It will be appreciated that the present device is very easily understood and may be operated with a minimal musical knowledge.

Accordingly, it is a primary object of the present invention to provide an improved musical slide rule for fretted instruments.

Another object of the present invention is to provide an improved musical slide rule for fretted musical instruments, as described above, wherein the fingering position for each string is individually displayed.

Another object of the present invention is to provide an improved musical slide rule for fretted instruments, as described above, for converting finger patterns to musical symbols and, conversely, for converting musical symbols into finger patterns.

An additional object of the present invention is to provide a device that is universal to all modern fretted instruments for pictorially displaying finger patterns.

Still another object of the present invention is to provide a device, as described above, that is equally usable by left handed and right handed players of fretted musical instruments.

An additional object of the present invention is to provide an improved musical slide rule for fretted instruments, as described above, that permits the restructuring of key board chords into playable fingering positions on fretted instruments.

An important object of the present invention is to provide an improved musical slide rule for fretted instruments, as described above, wherein the fingering position for each string is separately and independently displayed with respect to the other strings.

Another important object of the present invention is to provide an improved musical slide rule for fretted instruments, as described above, wherein the names of the notes of the chord are simultaneously displayed with the fingering positions thereof.

These and other objects, features and advantages of the invention will, in part, be pointed out with particularity, and will, in part, become obvious from the following detailed description of the invention, taken in conjunction with the accompanying drawings, which forms an integral part thereof.

BRIEF DESCRIPTION OF THE DRAWING

In the various figures of the drawing like reference characters designate like parts. In the drawing.

DESCRIPTION OF THE PREFERRED EMBODIMENT

Figure 1:
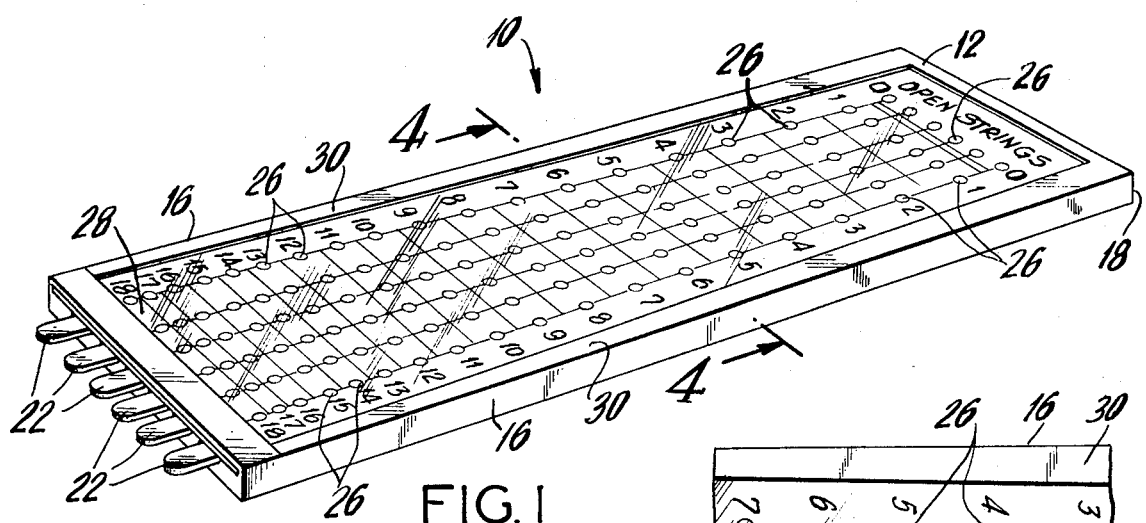
FIG. 1 is a perspective view of the present invention.

Referring now to the drawing there is shown one possible embodiment of the present invention together with several variations thereof. It should be understood, however, that the invention is not limited to the specific construction illustrated. As shown in FIG. 1 the slide rule 10 is arranged for a left player, for a right hand player the mirror image would be used. The slide rule 10 is comprised of a housing 12 which may be generally U-shaped as shown, for example, in FIG. 4. That is, the housing 12 includes a bottom wall 14 and two spacedly opposed, longitudinally extending side walls 16. The housing 12, may if desired, include an end wall 18 as shown in FIG. 1. In addition, the housing 12 is further provided with a plurality of longitudinally extending divider walls 20 that define guideways or channels 22 therebetween.

Figure 2:
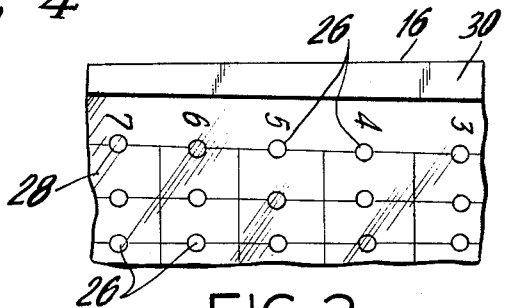
FIG. 2 is a fragmentary plan view, on an enlarged scale, of a portion of the device shown in FIG. 1.
Figure 3:
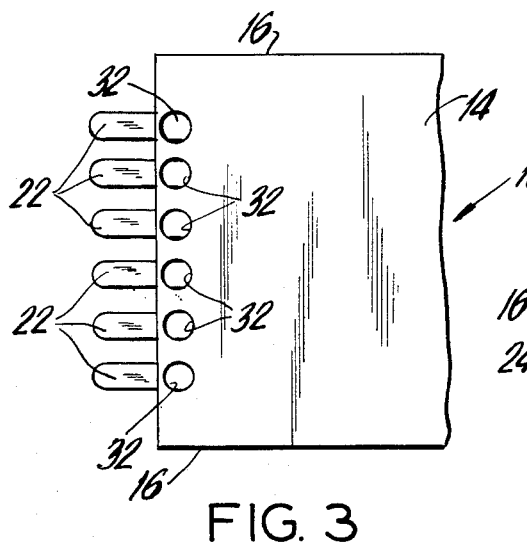
FIG. 3 is a fragmentary bottom plan view, on an enlarged scale, of the device shown in FIG. 1.
Figure 4:
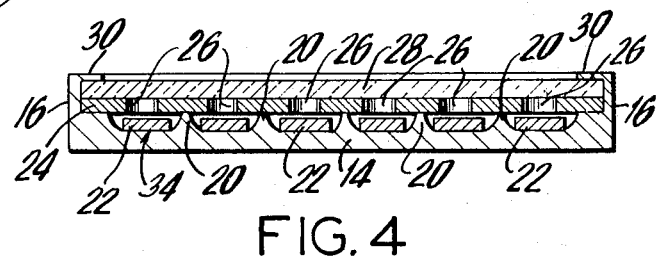
FIG. 4 is a transverse sectional elevational view taken along line 4—4 of FIG. 1.

A mask-like cover member 24 is positioned over the channels or guideways 22 as shown for example in FIG. 4. The mask 24 is non-movable and is provided with a plurality of openings 26 as shown for example in FIGS. 1, 2 and 4. The openings 26 are arranged in a grid-like pattern comprised of a plurality of longitudinally extending columns and a plurality of transversely extending rows. The columns are equal in number to the number of strings of the instrument and converge in a direction from left to right as shown in FIGS. 1 and 2. The rows of openings 26 are equal to the number of frets of the instrument. Each column of openings 26 is aligned over its respective channel 22. For purposes of providing a finished appearance and in order to provide a measure of protection to the mask 24 it is preferred that a transparent cover plate 28 be provided. The cover plate 28 may be secured in any suitable fashion such as by lateraly, inwardly directed lips 30 or by adhesive means.

For purposes to be described hereinafter the bottom wall 14 of the slide rule 10 includes a transverse row of openings 32 positioned at one end thereof. The openings 32 are equal in number to the channels 22 and are positioned in alignment therewith.

Figure 5:
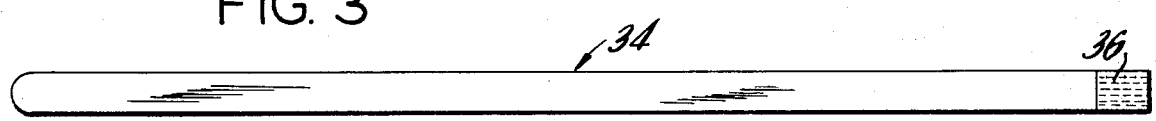
FIG. 5 is a plan view of a typical one of the slide members shown in FIG. 1.
Figure 6:
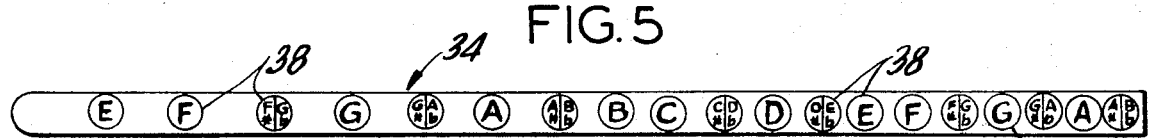
FIG. 6 is a plan view of the reverse surface of the slide member shown in FIG. 5.

Referring now to FIGS. 5 and 6 there is shown a typical slide member generally designated by the reference character 34 that may be used with the present invention. The slide member 34 is an elongated rigid member having a reference mark 36 formed at one end thereof. The reference mark 36 may be in the form of a small painted area that will be visible through the openings 26 when the slide member 34 is axially displaced. The reverse side of the slide member 34 is provided with a sequential array of chromatic notes representing the scale of the string aligned with each channel 22. As pointed out hereinabove the six strings of a conventional guitar are named E, B, G, D, A, and E. The slide 34 for the E string is illustrated in FIG. 6. It will be seen that the slide 34 shown in FIG. 6 includes a full chromatic E scale plus another fraction thereof. When the slide member 34 is moved axially the reference mark 36 will successively appear in the openings 26 over the channel 22 corresponding to the E string. When the device 10 is turned over the letter notation of the musical note of the corresponding fret will appear within the opening 32 to provide an indication of the name of the tone at which the reference marker 36 is positioned. As will be appreciated the location of the reference marker 36 on the front surface of the slide rule will provide a finger positioning indication to produce the musical note shown through the opening 32.

Figure 7:
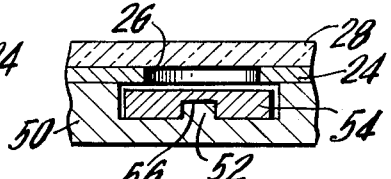
FIG. 7 is a fragmentary transverse sectional elevational view of an alternative embodiment of the structure shown in FIG. 4.
Figure 8:
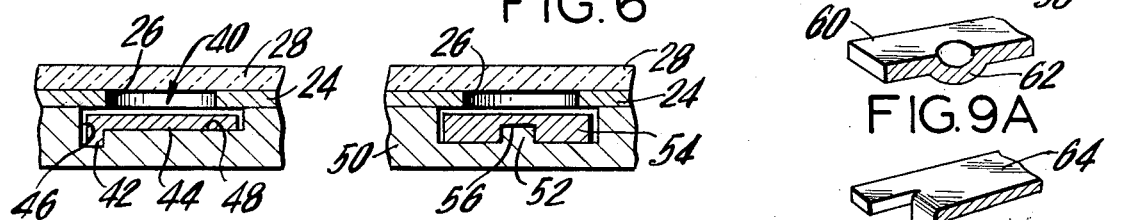
FIG. 8 is a fragmentary transverse sectional elevational view of still another alternative embodiment of the structure shown in FIG. 4.

As it will be readily apparent, from the foregoing it is necessary that the slides 34 move freely within the channels 22. However, it would be undesirable if the slides 34 moved too freely. The channels 22 should be dimensioned so as to provide a snug yet relatively free fit for the slides 34. FIGS. 7 and 8 illustrate alternative embodiments for achieving such a fit. As shown in FIG. 7 the slide 40 is L-shaped and includes a first leg 42 and a second leg 44. Similarly the channel is L-shaped and is comprised of a first leg 46 for receiving the leg 42 of the slide 40 and a second leg 48 for receiving the second leg 44. In the embodiment illustrated in FIG. 8 the base member 50 is provided with a tang 52 while the slide 54 is provided with a mating groove 56. Both of the embodiments shown in FIGS. 7 and 8 provide for accurate guidance and control of the slide members.

Figure 9A:
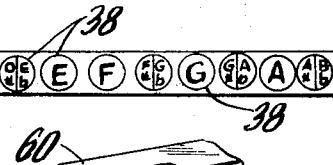
FIGS. 9A and 9B are fragmentary perspective views, in section, illustrating alternative constructions for the slide members shown in FIG. 1.
Figure 9B:

Although it has been mentioned heretofor that an end wall 18 may be provided it will be appreciated that the manufacture of the slide rule 10 will be simpler and less expensive if the end wall is omitted. However, means must be provided for preventing the slides 34 from moving further inward than is shown in FIG. 1. The embodiments of FIGS. 9A and 9B provide such a feature. As shown in FIG. 9A a slide member 60 is provided with a small detent 62 that will prevent the further movement of the slide 60 beyond the position shown in FIG. 1 even if the end wall 18 is omitted. An alternative embodiment shown in FIG. 9B comprises a slide 64, the end of which is bent down as shown by the tab 66. Even if the end wall 18 is omitted the construction shown in FIG. 9B will prevent the slide 64 from moving further inward than the position shown in FIG. 1. The tab 66 shown in FIG. 9B may be centrally located, as shown, or may be contiguous with one side edge of the slide 64.

It will be appreciated from the foregoing that improved means have been provided for assisting the fretted instrument player to convert written musical symbols or notes into pictorial patterns. The fingering patterns appear directly on the face of the device when the slide members are moved out. If the musical chord is known the reverse side of the instrument may be used with the slides being pulled out until the appropriate notes appear in the openings on the rear surface of the device. When the device is turned over the appropriate finger pattern for the desired chord will be visually displayed. Conversely if the finger pattern is known and is displayed on the front surface of the device by appropriately pulling the slides outwardly, the corresponding chord may be read directly on the reverse side of the device through the openings therein.

It will be appreciated that the present invention may be used on any modern fretted instrument as well as many ancient and exotic fretted instruments. If the instrument does not have six strings as illustrated in the drawing but has less then it is a simple matter to discard one or more of the slides. It should therefore be understood that the invention is not limited to the six slides as shown but may have a greater or smaller number thereof.

It will be appreciated that by providing Braille of other three dimensional indicia the apparatus may e used by blind persons.

There has been disclosed heretofore the best embodiment of the invention presently contemplated. However, it is to be understood that various changes and modifications may be made thereto without departing from the spirit of the invention.

What claim as new and desire to secure by Letters Patent is:

1. A slide rule for a fretted musical instrument having a plurality of differently tuned strings, said slide rule comprising:
   a. a housing including a plurality of channels corresponding to the strings of the instrument, said channels being defined by a plurality of longitudinally extending, laterally spaced apart walls and a common base wall, there being further included a row of transversely oriented openings in said base wall, each of said base wall openings being in registry with one of said channels;
   b. a mask covering said channels, said mask having a plurality of openings therethrough, said openings being arrayed in a grid-like pattern defined by a plurality of generally longitudinally extending columns and a plurality of generally transversely extending rows, each of said columns of openings being in registry with one of said channels, said rows of openings being spaced apart from each other in the same proportion as the frets of the musical instrument; and
   c. an elongated, axially movable slide member positioned in each of said channels, one surface of each of said slide members including a reference marker thereon, the other surface of each of said slide members including a sequential array of letter symbols representing the chromatic scale of the string corresponding to each said channel.

2. The slide rule in accordance with claim 1 wherein said row of base wall openings are proximate one end of said housing and said reference markers are proximate the other end of said housing when said slide members are inserted in said channels.

3. The slide rule in accordance with claim 1 wherein said columns of openings in said mask converge.

4. The slide rule in accordance with claim 1 wherein there is further included a transparent cover positioned over said mask.

5. The slide rule in accordance with claim 1 wherein each said reference marker is defined by an area having a color different than the remainder of said slide member.

6. The slide rule in accordance with claim 1 wherein said housing further includes an end wall for limiting the inward movement of said slide members.

7. The slide rule in accordance with claim 1 wherein there is further included a depression on each of said slide members proximate one end thereof for limiting the inward movement thereof.

8. The slide rule in accordance with claim 1 wherein there is further included a bent tab integral with one end of each of said slide members for limiting the inward movement thereof.

9. The slide rule in accordance with claim 1 wherein each slide member includes a longitudinal rib and said housing includes groove means for slidably receiving said ribs.

10. The slide rule in accordance with claim 1 wherein said markers and symbols are raised whereby they may be sensed by a blind person.

* * * * *